US011492209B2

(12) United States Patent
Hahn

(10) Patent No.: US 11,492,209 B2
(45) Date of Patent: Nov. 8, 2022

(54) APPARATUS AND METHOD FOR DISCHARGING CONTAINERS FROM CONTAINER STREAMS

(71) Applicant: KRONES AG, Neutraubling (DE)

(72) Inventor: Wolfgang Hahn, Neutraubling (DE)

(73) Assignee: KRONES AG

( * ) Notice: Subject to any disclaimer, the term of this patent is extended or adjusted under 35 U.S.C. 154(b) by 41 days.

(21) Appl. No.: 17/076,744

(22) Filed: Oct. 21, 2020

(65) Prior Publication Data

US 2021/0122583 A1 Apr. 29, 2021

(30) Foreign Application Priority Data

Oct. 24, 2019 (DE) .................... 10 2019 128 771.5

(51) Int. Cl.
*B65G 47/29* (2006.01)
*B65G 47/82* (2006.01)
(Continued)

(52) U.S. Cl.
CPC ............. *B65G 47/29* (2013.01); *B07C 5/362* (2013.01); *B29C 49/4205* (2013.01); *B65G 47/82* (2013.01); *B67C 3/007* (2013.01); *B67C 7/004* (2013.01); *B67C 7/0073* (2013.01); *B65G 2201/0235* (2013.01)

(58) Field of Classification Search
None
See application file for complete search history.

(56) References Cited

U.S. PATENT DOCUMENTS 2,606,657 A * 8/1952 Berthelsen ............. B07C 5/124
209/591
5,591,462 A * 1/1997 Darling .............. G01N 21/9081
356/240.1
(Continued)

FOREIGN PATENT DOCUMENTS

DE 32 24 449 1/1985
EP 2 284 120 2/2011 ............ B67C 3/00

OTHER PUBLICATIONS

German Search Report issued in German Patent Appln. No. 10 2019 128 771.5, dated Jul. 27, 2020, with machine English translation, 11 pages.

*Primary Examiner* — Kavel Singh
(74) *Attorney, Agent, or Firm* — Hayes Soloway P.C.

(57) ABSTRACT

An apparatus for treating containers with a first treatment device configured to treat the containers in a predetermined first manner, with a transport device which transports the containers in a predetermined transport direction, wherein the transport device transports the containers in a transport stream extending in the transport direction, and with a reject device arranged after the first treatment device, which is configured to reject a plurality of containers arranged one after the other in the transport direction from the transport stream, wherein the apparatus has a second treatment device which is arranged before the first treatment device in the transport direction of the containers. The apparatus has a gap generating device which is arranged in front of the first treatment device in the transport direction of the containers and which generates at least one gap in the transport stream of the containers.

11 Claims, 2 Drawing Sheets

(51) Int. Cl.
*B07C 5/36* (2006.01)
*B67C 7/00* (2006.01)
*B67C 3/00* (2006.01)
*B29C 49/42* (2006.01)

(56) References Cited

U.S. PATENT DOCUMENTS

| | | | | |
|---|---|---|---|---|
| 8,227,760 | B2 * | 7/2012 | Hahn | G01N 21/9009 |
| | | | | 250/372 |
| 8,777,604 | B2 * | 7/2014 | Senn | B29C 49/68 |
| | | | | 425/526 |
| 8,806,840 | B2 | 8/2014 | Bierschneider | B67C 3/007 |
| 11,033,996 | B2 * | 6/2021 | Heppe | B65B 3/003 |

* cited by examiner

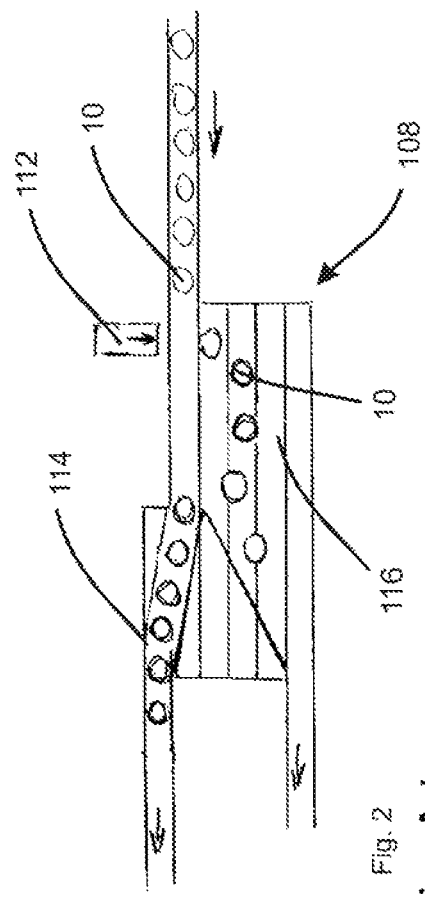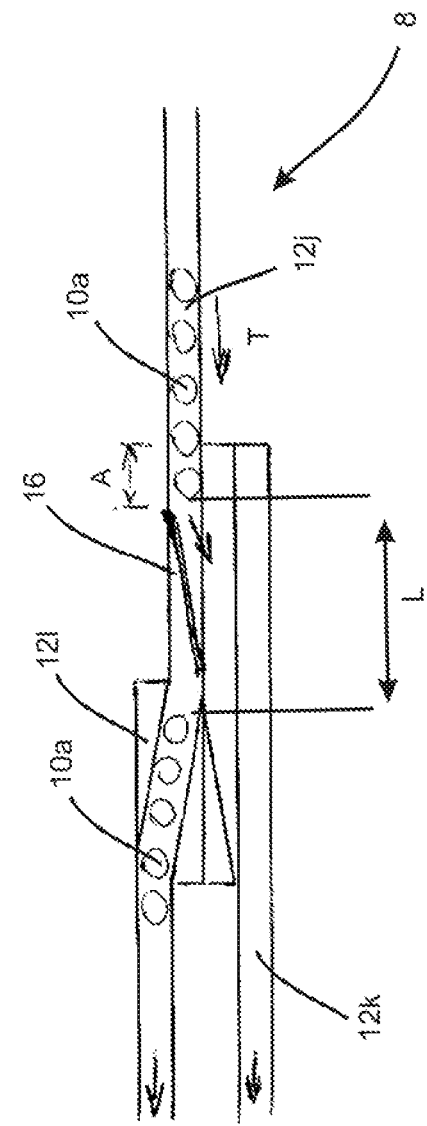

APPARATUS AND METHOD FOR DISCHARGING CONTAINERS FROM CONTAINER STREAMS

BACKGROUND OF THE INVENTION

The present invention concerns an apparatus and a method for treating containers. Various apparatus and methods for treating containers are known from the prior art. With such apparatus and methods, it is known to carry out inspections of the manufactured products for quality control or other purposes.

In the case of filling equipment, for example, it is known that several containers are inspected, which, for example, have been filled by all filling elements of a filler. For this purpose, a predetermined number of containers is generally discharged from a product stream of containers, in particular a number corresponding to the number of treatment elements. For this purpose, rejection systems are known from the prior art which serve for reject containers from a product stream. An inspection of the containers can be carried out by an operator after rejection or discharge or also in a laboratory In the prior art, a complex rejection system with a wide conveyor is usually used, which can reject the containers individually and, in particular, also at full capacity in an upright position. It is known, for example, to provide an upright rejection system with a wide bottle table after a filler and to reject the containers individually. The rejection can be carried out on a conveyor belt.

The object of the present invention is therefore to provide an apparatus and a method by which such rejections of products or groups of products can be more easily carried out. In this case it is conceivable that the number of products to be rejected and in particular containers and especially bottles corresponds to the number of treatment elements, for example the number of filling valves or also the number of closing heads (in the case of a closer).

SUMMARY OF THE INVENTION

An apparatus for treating containers according to the invention has a first treatment device which is suitable and intended to treat the containers in a predetermined first manner. Furthermore, the apparatus comprises a transport device which transports the containers in a predetermined transport direction, wherein the transport device transports the containers in a transport stream extending in the transport direction. Preferably, the transport stream in and between the treatment stations is at a distance, i.e. the containers cannot touch each other. In other words, the transport device is suitable and intended to transport the containers in such a way—especially one after the other—that they do not touch each other. Furthermore, the device has a rejection device arranged after the first treatment device, which is suitable and intended to reject a plurality of containers arranged one after the other in the transport direction from the transport stream.

Furthermore, the apparatus has a second treatment device which is arranged in front of the first treatment device in the transport direction of the containers.

According to the invention, the apparatus has a gap generating device, which is arranged in the transport direction of the containers before the first treatment device and which generates at least one gap in the transport stream of the containers. It is therefore proposed within the scope of the invention that the gaps in the transport stream or the container stream are already generated before the rejection and in particular also before the first treatment device.

Preferably, there is at least one treatment device in the transport direction between the gap generating device and the rejection device.

In another advantageous embodiment, the first treatment device has a plurality of similar treatment stations which treat the containers in the same way. These treatment stations can be, for example, forming stations which transform plastic material preforms into plastic material containers, or also filling devices which fill the containers, or also labelling devices which apply labels to the containers, or also sterilisation devices which sterilise the containers.

In a further advantageous embodiment, also the second treatment device comprises a plurality of similar treatment stations which treat the containers in the same way.

In a further preferred embodiment, the first treatment stations and/or the second treatment stations are each arranged on a movable carrier. In particular, this can be a rotating carrier. In a further advantageous embodiment, at least one treatment device and preferably both treatment devices are also part of the transport device. This means that the treatment devices itself are also suitable and intended to transport the containers at least along part of the transport path. Preferably, the containers are transported during the treatment process, for example a forming process, a sterilisation process or a filling process.

Furthermore, the transport device may preferably have other transport elements or transport units, such as, in particular but not exclusively, transport wheels, transport stars, chain conveyors and the like.

Preferably, the treatment devices therefore also form components of the transport device. In the context of the present disclosure, containers are defined in particular as bottles and in in particular plastic material bottles. However, containers can also be preforms, in particular plastic material preforms, which are formed into plastic material containers in the sense of plastic material bottles, for example by blow moulding machines and in particular by stretch blow moulding machines.

In a further advantageous embodiment, the transport device is suitable and intended to transport the containers at least section by section individually in the transport direction. For this purpose, the transport device can comprise gripping elements, such as gripper clamps, which transport the containers individually. In a further preferred embodiment, however, the transport device also transports the containers section by section as a row and/or one behind the other and therefore not individually, in these areas, the transport device can have conveyor rails or conveyor belts, for example.

The rejection device is preferably located in an area of the transport device in which the containers are not transported individually and/or one behind the other. The gap generating device is also preferably located in an area of the transport device in which the containers are not transported individually and/or one behind the other.

In a further preferred embodiment the apparatus is a blocked system, in particular a system in which the treatment devices are operated in dependence on each other and/or are synchronised. Thus, for example, if a working speed of one treatment device is changed, the working speeds of other treatment devices that are synchronised with this first-mentioned treatment device can also be changed in the same way. This synchronisation is carried out in particular electronically and/or by software, but mechanical couplings between individual plant components would also be conceivable. Particularly preferable, the apparatus is designed in such a way that each treatment station of the second treatment device, which treats a specific container, can also be assigned to a specific treatment station of the first treatment device, which can treat the same container in the further course of the process. Thus, for example, it can be determined by means of a processor device that, for example, blowing station No. 5 of a forming device forms a container which is then filled by filling valve No. 13 of a downstream filling device. This is possible in particular because the containers are transported individually between the forming station and the further treatment device such as a filling device, so that their exact number is in known.

In a further preferred embodiment, the containers are conveyed at least in sections and preferably completely in a single row. This means that, for example, holding elements for the containers are preferably arranged one behind the other in the transport direction of the containers.

In a further preferred embodiment, the rejection device has a movable rejection element which is suitable and intended for rejecting a predetermined number of containers. This rejection system can, for example, have a guide rail that can be pivoted into the product stream, which rejects all containers and rejects them, in particular on a conveyor provided for this purpose and, in particular, a single-track conveyor.

The rejection element can be pivoted or moved into gaps in the product stream created by the gap generating device. The specified number of containers can be rejected by this pivoting.

In the case of a further advantageous embodiment, the first treatment device is selected from a group of treatment devices which comprise forming devices for forming plastic material preforms into plastic material containers, heating devices for heating plastic material preforms, sterilisation devices for sterilising containers, labelling devices for labelling containers, printing devices for printing on containers, filling devices for filling, closing devices for closing containers and the like.

In a further preferred embodiment, the gap generating device is arranged in the transport direction before the second treatment device, within the second treatment device or after the second treatment device. In a further preferred embodiment, the gap generating device is arranged in the transport direction before the first treatment device, within the first treatment device or after the first treatment device.

For example, the gap generating device can be a so-called preform barrier or blocking device, which is suitable for interrupting a flow of plastic material preforms for a predetermined period of time or for a predetermined number of pieces, so that, for example, subsequent treatment devices, such as a forming station, are not loaded in some cases. For example, a preform barrier can initially be briefly blocked and create a gap of a predetermined number of plastic material preforms.

In this case a gap of at least two, preferably at least three plastic material preforms can be produced. Furthermore, a gap of, for example, less than 20, preferably less than 15, preferably less than 10, preferably less than 8 and preferably less than 6 plastic material preforms and/or containers can be produced.

Preferably, in a second step after a further specified number of plastic material preforms, the preform barrier can be blocked in the same way to create a second gap. A predetermined number of containers and/or plastic material preforms are preferably located between the first and second gap, in particular a number corresponding to the number of treatment stations of a treatment device. These treatment stations can be, for example, filling stations of a filling device, capping stations of a closing device or similar.

As mentioned above, these gaps created in this way can be used to pivot in and out the rejection element.

Furthermore, it would also be possible for plastic material preforms to be rejected and/or gaps to be created after a heating device or after an oven of a blowing machine, but before the actual forming device or blowing stations, in this case, likewise again a predetermined number of plastic material preforms can be rejected or blocked, for example between 2 and 8, preferably between 3 and 6 plastic material preforms, thus likewise creating a first gap in the product stream. In a second step, after a specified number of plastic material preforms or containers in general, a specified number of plastic material preforms can be blocked again to create a second gap.

Preferably, the above-mentioned guide rail or a rejection element can be pivoted into the first created gap in the product stream to reject the predetermined number of containers or bottles. In the second gap, the guide rail or the rejection element can be pivoted back and the product stream is preferably directed back to the following machine or to the following handling device.

Furthermore, it is conceivable that the apparatus has an allocation device which allocates containers to treatment elements, such as filling valves or capping heads. However, this is not necessarily required.

In a further embodiment the first treatment device is a filling device which fills containers. A further treatment device is preferably a forming device which forms plastic material preforms into plastic material containers. However, it could also be other treatment devices such as sterilisation devices. In the transport direction of the plastic material preforms, a heating device is preferably arranged in front of the forming device, which heats the plastic preforms.

In a further advantageous embodiment, the gap generating device ensures that a predetermined number of holding elements, for example gripping elements for holding the plastic material preforms, are not occupied. In the case of a forming device, this has the effect that a plurality of forming stations transported or arranged successively are not occupied.

In a further preferred embodiment, the forming device has a plurality of forming stations, each of which is suitable and intended for forming the plastic material preforms into plastic material containers. Preferably, these forming stations each have bar-like bodies and/or stretching bars which can be inserted into the plastic material preforms in order to stretch them in their longitudinal direction.

In a further preferred embodiment, the forming stations each have blow moulds which form a cavity within which the plastic material preforms can be formed into plastic material containers and in particular plastic material bottles by acting upon with a flowable medium. The flowable medium can be a gaseous medium, such as compressed air. However, the flowable medium can also be a liquid medium and in particular a beverage to be filled.

In a further preferred embodiment, the forming stations in each case comprise a stressing device which is suitable and intended to act upon the plastic material preforms with a flowable medium.

Therefore, as mentioned above, successive forming stations are preferably not occupied by the gap generation device.

In a further preferred embodiment, the apparatus has a control device which controls the rejection device in depending on the gap generating device. A time control may be provided, for example, which actuates or activates the rejection device when the respective gap has reached it. However, a control system can also be provided which counts the containers. Therefore, the rejection device is particularly preferably controlled depending on the gap generating device.

The present invention enables cost savings by means of a simple guide rail, which can preferably be pivoted into the product stream or container stream, and a—particularly single-track—conveyor. In contrast to the prior art, no bottle handle is therefore required for rejection. In addition, no rejection of each individual container is necessary. Also, no filled, closed (and possibly labelled) containers or bottles are rejected for the gap. In this way, the loss can also be reduced.

In a further preferred embodiment, the rejection unit has a guide rail which is suitable and intended to guide the containers at least on one side but preferably on both sides.

The present invention is further directed to a method for treating containers, wherein a first treatment device treats the containers in a predetermined first manner and a transport device transports the containers in a predetermined transport direction and wherein the transport device transports the containers in a transport stream extending in the transport direction and wherein a rejection device arranged after the first treatment device rejects a plurality of containers arranged in succession in the transport direction from the transport stream and wherein a second treatment device, which is arranged in the transport direction of the containers in front of the first treatment device, treats the containers in a second predetermined way.

According to the invention, at least at times a first gap is generated in the transport stream of the containers by means of a gap generating device, which is arranged in the transport direction of the containers before the first treatment device.

It is therefore also suggested on the method side that a predetermined gap is created specifically upstream of the rejection unit. A rejection element of the rejection device is particularly preferred to be placed in the said gap in order to reject a predetermined number of containers.

In a further preferred embodiment, the gap generation device creates a further gap in a transport stream.

Preferably, the first gap mentioned above is placed before the containers to be rejected and the second gap after the containers to be rejected. In other words, the containers to be rejected are positioned between these two gaps.

As mentioned above, it is preferable to pivot the rejection element into the first gap and pivot it out again in the second gap.

In a further preferred method, the rejection device is located in an area in which the transport device transports the containers against each other and, in particular, in contact with each other. This applies, for example, if the rejection device is used for rejecting containers in the form of plastic material preforms. In this area, the transport device can be for example a conveyor belt or a feed rail.

With this design, the transport device preferably transports the containers partially or sectionally individually and sectionally against each other as a container stream.

However, it is also conceivable that the rejection device is located in an area in which the containers are transported one behind the other but do not touch each other. In this way, for example, the containers could be transported freely on a conveyor belt without touching each other.

In a further preferred method, the treatment devices are at least temporarily synchronised with each other, i.e. controlled in a coordinated manner at least in a working mode.

Further advantages and embodiments are shown in the attached drawings.

BRIEF DESCRIPTION OF THE DRAWINGS

In the drawings:

FIG. 2 is a representation of a rejection device according to the applicant's internal prior art;

FIG. 3 is a representation of a rejection device according to the invention.

DETAILED DESCRIPTION OF THE INVENTION

Figure 1:
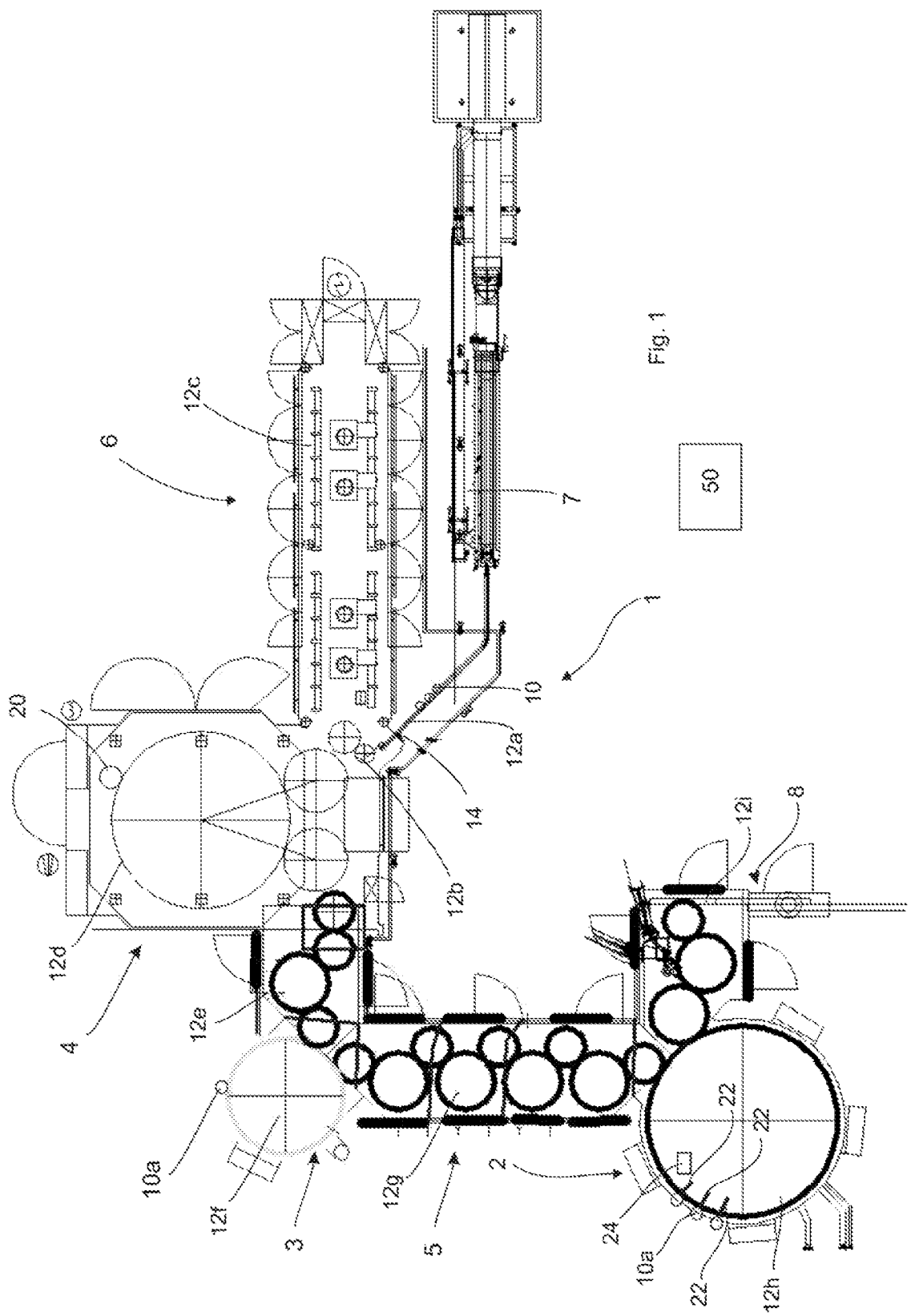
FIG. 1 is a representation of an apparatus for treating containers.

FIG. 1 shows an apparatus 1 for the treatment of containers. This device is shown as an example to illustrate the invention. It is pointed out that other units or aggregates may be present in addition to or instead of the individual units or aggregates shown.

The apparatus 1 has a plurality of treatment units 2, 3, 4, 5, 6 and 7, which are each connected to each other by transport segments. Accordingly, the reference signs 12a to 12h show segments or sections of a transport device or transport units.

The reference sign 2 indicates a treatment device, which is a filling device. This treatment station 2 has a plurality of treatment elements 22 or treatment stations 22, which here are, for example, filling valves for filling containers or bottles 10a.

Reference number 24 indicates a monitoring unit which, for example, checks the fill level of the individual containers during filling.

The reference sign 4 indicates a second treatment device, which is here a blow-moulding machine or a stretch blow-moulding machine. This blow-moulding machine has a rotating carrier on which forming stations 20 (only one shown) are arranged.

The reference sign 7 indicates a sorting device which is used for aligning or sorting plastic material preforms 10, which are also to be regarded as containers here. These are first conveyed via a first transport unit 12a of the transport device in the direction of a synchronisation star wheel 12b, which represents a second transport unit 12b. The reference sign 14 indicates an infeed stop, with which the supply of plastic material preforms to the transport unit 12b can be stopped.

This infeed stop 14 allows the stream of the plastic material preforms or containers 10 to be interrupted for a predetermined number. This preform barrier thus serves as a gap generation device, which can create a gap in the flow of containers, for example a gap for four containers. The gap generation device is therefore preferably suitable and intended for generating defined gaps of n containers or n empty spaces in the container stream.

The reference sign 6 indicates a further treatment device, here in the form of a furnace, through which the plastic material preforms or containers 10 are conveyed and heated. Correspondingly, the reference sign 12c indicates a further transport unit of the transport device. This transport unit can be a chain conveyor in particular, on which a plurality of holding elements are arranged for holding the containers and transporting them individually.

This treatment device 6 is followed by the above-mentioned second treatment device 4 in the form of a forming device for forming plastic material preforms into plastic material containers. The rotatable carrier 12*d* is also designed as a further transport unit of the transport device. A sterilisation unit 3 in the form of a further treatment device can follow the forming device.

The reference signs 12*e* and 12*f* represent further transport units of the transport device. The reference sign 10*a* indicates a container, but here already formed containers or plastic material bottles are present.

The treatment device 3 is followed by a further treatment device 5, in which container sterilisation can also be performed. The reference sign 12*g* accordingly indicates a further transport unit, which in this case may be formed by a plurality of transport star wheels.

This treatment device 5 is followed likewise by the first treatment device 2 mentioned above.

The reference sign 8 schematically indicates a rejection device which can be used to reject the containers which have already been produced and filled. In each case, a specified number of containers is rejected, for example a number corresponding to the number of filling elements 22 of the first treatment unit.

The reference sign 12*l* indicates a further transport unit of the transport device 12. In this case it is indicated here that some of the transport units cause the containers to be transported individually and some of the transport units cause the containers to be transported one after the other and in particular not being individually gripped.

However, transport units are also conceivable by means of which the containers are not transported individually but do not touch each other. For example, the containers can be transported standing on a conveyor belt but still have a distance to each other. In particular, it is conceivable that this distance between the containers can change during transport.

It is also conceivable that in a first operating mode, the containers are transported at a distance from each other, but under certain circumstances touch each other, for example if a proper transport of a container is (temporarily) prevented.

Thus, for example, transport unit 12*a* is such a transport unit where the containers are not transported individually. For example, conveyor unit 12*a* could be a guide rail within which the plastic preforms slide one after the other.

Also the transport unit 12*i* is a transport unit in which the containers are not transported individually, but rather one after the other. However, here too, the containers preferably have a certain distance to each other. This conveyor unit 12*i* is preferably a conveyor belt. This means that this conveyor unit also has no individual holding or gripping elements for holding and/or gripping the containers.

On the other hand, the transport units 12*b* to 12*h* each allow the plastic containers to be transported individually. Here the containers are preferably kept at a distance from each other by force. For this purpose, the aforementioned transport units 12*b* to 12*h* preferably have three front holding elements to hold and/or grip the individual plastic preforms and thus convey them one behind the other or individually. The rejection device 8 therefore acts in an area of that conveyor unit 12*i* which does not convey the containers individually and/or freestanding on a conveyor belt. In this way, the rejection device can reject a plurality of containers transported one behind the other. As mentioned above, a rejection means the removal of containers from a normal product stream used for production.

The reference sign 50 indicates a control device of the present installation. This is particularly also suitable and intended to control the rejection device depending on the gap generation device. If, for example, the gap generating device generates a gap in the container stream at a first time T1, the control device can control the rejection device 8 at a time T1+dT to reject the containers. The time dT is the time required for the gap to move from the gap generation device to the rejection device.

It should be noted that the gap generating device may be located at other points in the installation, for example after the heating device 6 and before the treatment device 4.

FIG. 2 shows a design of a rejection device 108 according to the applicant's internal prior art. Two conveyor belts 114 and 116 are provided here. During normal operation, the containers are transported in the product stream onto the conveyor belt 114. The reference sign 112 indicates a rejection element, such as a so-called pusher, which can push a plurality of containers onto the second conveyor belt 116, which serves for rejection. This conveyor device 116 is relatively wide and therefore takes up a lot of space.

It can be seen that it is not always possible to clearly predict how far the containers will be moved or on which conveyor they will stop. For this reason, the second conveyor belt is designed relatively wide.

FIG. 3 shows a rejection device 8 according to the invention. Here, a plurality of containers 10*a* also arrive in a product stream in the transport direction T. A corresponding conveyor unit 12*j* is shown.

The reference sign L indicates a gap between the containers 10*a* and the other containers 10*a* shown on the left. This gap L was created by the gap generation device 14.

The reference sign 16 indicates a rejection element, which can be pivoted here in the figure plane, for example, in order to intervene in a gap and reject a predetermined number of containers onto a transport unit 12*k*. The transport unit 12*l* is the transport unit which is used for transporting the correct containers, i.e. the containers during normal working operation. The reference sign A shows the distance between two containers. These are transported here in such a way that they do not touch each other.

It can be seen that the rejection element shown in FIG. 3 achieves a smoother transfer movement of the containers. In this way the apparatus can be dimensioned smaller in the direction of transport as well as perpendicular to it.

In the context of the invention, it is now proposed in particular that the gap in the containers is already generated far upstream, for example by means of the gap generating device 14 shown in FIG. 1. Preferably, therefore, at least one treatment device is arranged between the rejection device 8 and the gap generating device 14 and in particular at least one treatment device selected from a group of treatment devices which include filling devices, devices for forming plastic material preforms into plastic material containers, heating devices, sterilization devices, labelling devices and the like.

In the illustration shown in FIG. 1 the preform barrier is shown in an area in front of the heating device or oven 6.

However, it would also be possible that the gap generation device is arranged downstream of the heating device or oven 6 in the transport direction of the containers. It would also be conceivable that such a barrier could also be arranged downstream of the forming device. FIG. 1 furthermore shows a control device 50 which controls the rejection device 8 also in response to an actuation of the gap generation device 14. Thus, for example, it can be specified that at a certain machine speed after the gap has been generated by the gap generating device 14, the rejection element 16 can move into this gap and at the respective further gap the rejection element can be reset again.

The applicant reserves the right to claim all features disclosed in the application documents as being essentially inventive, provided that they are, individually or in combination, new compared to the prior art. It is further pointed out that the individual figures also describe features which may be advantageous in themselves. The skilled person recognises immediately that a certain feature described in a figure can be advantageous even without adopting further features from this figure. Furthermore, the skilled person recognises that advantages may also result from a combination of several features shown in individual or different figures.

LIST OF REFERENCE SIGNS 1 apparatus
2 treatment device, filling device
3 treatment device, sterilisation unit
4 treatment device, blow moulding machine, stretch blow moulding machine
5 treatment device
6 treatment device, oven
7 treatment device, sorting device
8 rejection device
10 plastic material preforms
10a bottle, container
12 transport equipment
12a-12h segments or sections of the transport device, transport units
12a transport rail
12b synchronisation star wheel
12c chain conveyor
12d rotatable carrier
12e transport star wheel
12f transport carrier
12g transport star wheel
12h transport carrier
12I transport unit
12j Transport unit
12k transport unit
12l transport unit
14 inlet stop, gap generation device
16 rejection element
20 forming stations
22 treatment elements, treatment stations, filling elements
24 monitoring unit
50 control device
108 rejection device
112 rejection element
114 conveyor belt
116 conveyor belt
L gap
T transport direction
A distance between two containers

The invention claimed is:

1. An apparatus for treating containers, said apparatus having a first treatment device configured for treating the containers in a predetermined first manner, and a transport device configured for transporting the containers in a predetermined transport direction, wherein the transport device is configured to transport the containers in a transport stream extending in the transport direction, said apparatus further having a rejection device arranged downstream of the first treatment device and which is configured for rejecting a plurality of containers arranged one after the other in the transport direction from the transport stream, and a second treatment device which is arranged in front of the first treatment device in the transport direction of the containers, wherein the apparatus has a gap generating device which is arranged in front of the first treatment device in the transport direction of the containers and which is configured to generate at least one first gap in the transport stream of the containers, and wherein there is at least one treatment device in the transport direction between the gap generating device and the rejection device, and wherein the rejection device comprises a movable rejection element which is configured for rejecting a predetermined number of the containers, wherein the rejection element is movable into the first gap generated by the gap generating device, so that the predetermined number of the containers can be rejected and the gap generating device generates a second gap, wherein the rejection element is pivoted into the first gap reject the predetermined number of containers and in the second gap the rejection element is pivoted back, so that the containers to be rejected are positioned between the first gap and the second gaps.

2. The apparatus according to claim 1, wherein the transport device is configured to transport the containers individually in the transport direction.

3. The apparatus according to claim 2, wherein the first treatment device is selected from a group of treatment devices consisting of filling devices for filling containers, closing devices for closing containers, labelling devices for labelling containers, printing devices for printing containers, and sterilisation devices for sterilising containers.

4. The apparatus according to claim 2, wherein the second treatment device is selected from a group of treatment devices consisting of forming devices for forming plastic material preforms into plastic material containers, heating devices for heating plastic material preforms, and sterilisation devices for sterilising containers.

5. The apparatus according to claim 2, wherein the gap generating device is arranged in the transport direction before the second treatment device.

6. The apparatus according to claim 2, wherein the gap generating device is a blocking device which is configured for interrupting a stream of plastic material preforms.

7. The apparatus according to claim 1, wherein the first treatment device is selected from a group of treatment devices consisting of filling devices for filling containers, closing devices for closing containers, labelling devices for labelling containers, printing devices for printing containers, and sterilisation devices for sterilising containers.

8. The apparatus according to claim 1, wherein the second treatment device is selected from a group of treatment devices consisting of forming devices for forming plastic material preforms into plastic material containers, heating devices for heating plastic material preforms, and sterilisation devices for sterilising containers.

9. The apparatus according to claim 1, wherein the gap generating device is arranged in the transport direction before the second treatment device.

10. The apparatus according to claim 1, wherein the gap generating device is a blocking device which is configured for interrupting a stream of plastic material preforms.

11. A method for treating containers using a first treatment device for treating the containers in a predetermined first manner and a transport device for transporting the containers in a predetermined transport direction wherein the transport device transports the containers in a transport stream extending in the transport direction and wherein a rejection device arranged after the first treatment device rejects a plurality of containers arranged one after the other in the transport direction from the transport stream, and wherein a second treatment device, which is arranged in front of the first treatment device in the transport direction of the containers, treats the containers in a second predetermined manner, wherein

- at least temporarily at least a first gap is created in the transport stream of the containers by a gap generating device which is arranged in front of the first treatment device in the transport direction of the containers, and wherein
- at least one treatment device is located in the transport direction between the gap generating device and the rejection device, and wherein
- the rejection device comprises a movable rejection element which is configured for rejecting a predetermined number of the containers, wherein the rejection element is movable into the first gap generated by the gap generating device, so that the predetermined number of the containers can be rejected and the gap generating device generates a second gap, wherein the rejection element is pivoted into the first gap reject the predetermined number of containers and in the second gap the rejection element is pivoted back, so that the containers to be rejected are positioned between the first gap and the second gaps.

* * * * *